(12) United States Patent
Barnum et al.

(10) Patent No.: US 11,422,816 B1
(45) Date of Patent: Aug. 23, 2022

(54) ORCHESTRATED SCALING OF CLOUD ARCHITECTURE COMPONENTS

(71) Applicant: Capital One Services, LLC, McLean, VA (US)

(72) Inventors: Eric Barnum, Midlothian, VA (US); Anthony Reynolds, McLean, VA (US); Bryan Pinos, Williamsburg, VA (US); Joseph Krasinskas, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/397,005

(22) Filed: Aug. 9, 2021

(51) Int. Cl.
*G06F 9/30* (2018.01)
*G06F 9/355* (2018.01)
*G06F 9/50* (2006.01)
*G06K 9/62* (2022.01)
*G06N 20/00* (2019.01)
*G06F 9/38* (2018.01)

(52) U.S. Cl.
CPC .......... *G06F 9/3555* (2013.01); *G06F 9/3836* (2013.01); *G06F 9/5072* (2013.01); *G06K 9/6223* (2013.01); *G06N 20/00* (2019.01)

(58) Field of Classification Search
CPC .................................................... G06F 9/3555
USPC ......................................................... 712/205
See application file for complete search history.

(56) References Cited

U.S. PATENT DOCUMENTS

2018/0285766 A1* 10/2018 Shen ................... H04L 67/12

OTHER PUBLICATIONS

Yang et al., Workload Predicting-Based Automatic Scaling in Service Clouds, 2013, IEEE Sixth International Conference on Cloud Computing, pp. 810-815.*

* cited by examiner

*Primary Examiner* — Timothy A Mudrick
(74) *Attorney, Agent, or Firm* — DLA Piper LLP US

(57) ABSTRACT

A computer-implemented method is disclosed. The method can comprise: monitoring utilization of a cloud architecture component that is being used by a component utilizer; determining, via a machine learning model, a pattern of usage of the cloud architecture component based on the monitoring; determining, based on the pattern of usage, a first time period when the cloud architecture component is excessively used by the component utilizer and a second time period when the cloud resource is scantily used by the component utilizer; and orchestrating, based on the first and second time periods, a scaling of the cloud architecture immediately before a subsequent iteration of the pattern of usage by the component utilizer.

19 Claims, 5 Drawing Sheets

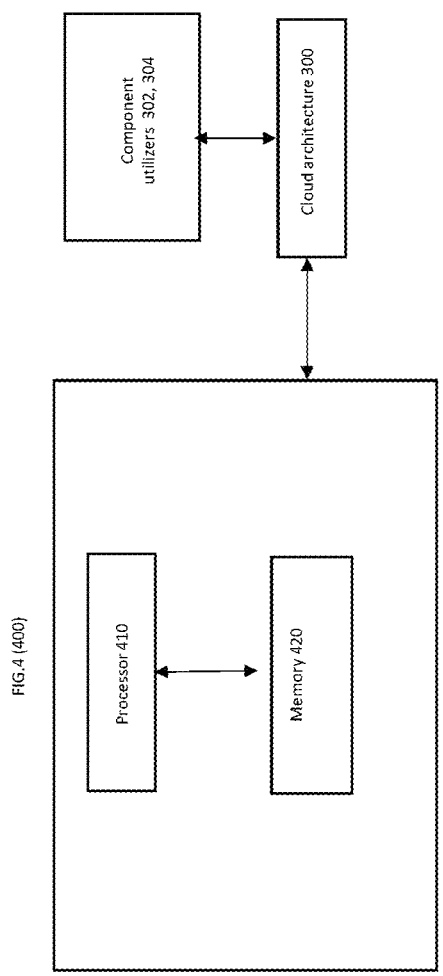

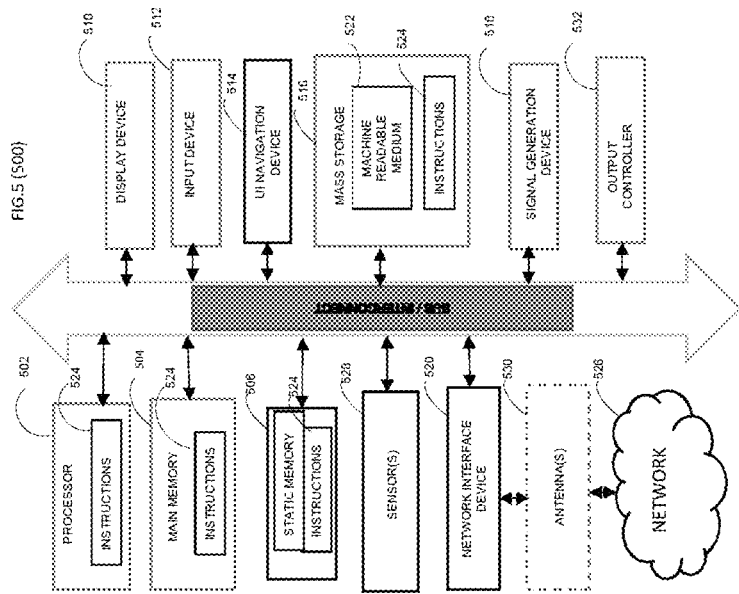

ORCHESTRATED SCALING OF CLOUD ARCHITECTURE COMPONENTS

BACKGROUND

Known cloud technologies focus on reactive and highly resilient architecture that is pay for use as its primary business model. In such technologies, cloud architecture and its components do not begin scaling until an external stimulus (e.g. increased network traffic or CPU utilization) triggers increased assets. The removal of assets when peak use fades also must be manually configured and assessed. Further, waiting for a stimulus can create a strain on resources given that it takes extra time for new auto-scaled resources to be provisioned. The provisioning itself can contain errors.

BRIEF DESCRIPTION OF DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which:

FIG. 4 illustrates a system diagram according to an example embodiment of the present disclosure; and FIG. 5 illustrates a machine configured to perform computing operations according to an embodiment of the present disclosure.

SUMMARY

Figure 1:
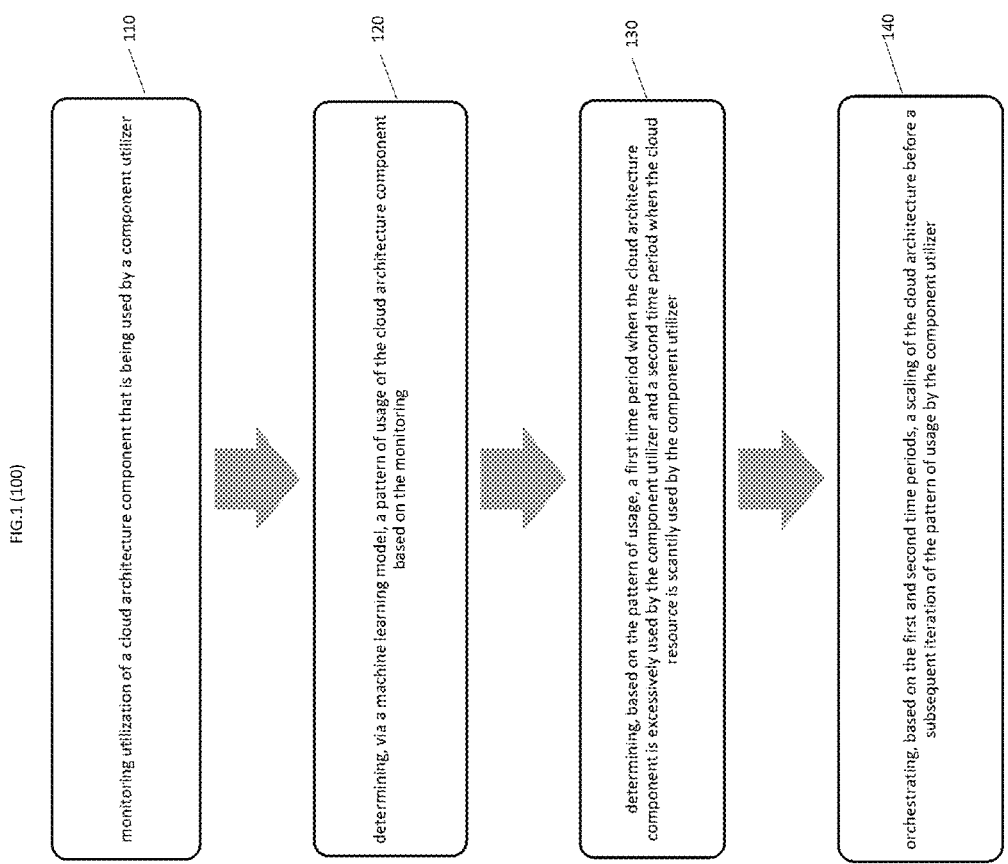
FIG. 1 shows a flowchart of a method according to an example embodiment of the present disclosure.

A computer-implemented method is disclosed. The method can include: monitoring utilization of a cloud architecture component that is being used by a component utilizer; determining, via a machine learning model, a pattern of usage of the cloud architecture component based on the monitoring; determining, based on the pattern of usage, a first time period when the cloud architecture component is excessively used by the component utilizer and a second time period when the cloud resource is scantily used by the component utilizer; and orchestrating, based on the first and second time periods, a scaling of the cloud architecture immediately before a subsequent iteration of the pattern of usage by the component utilizer.

In some example embodiments, orchestrating the scaling of the cloud architecture may include: decreasing utilization of the cloud architecture component immediately before a subsequent iteration of the first time period; and increasing utilization of the cloud architecture component immediately before a subsequent iteration of the second time period.

In various example embodiments, the method can further include: determining that the cloud architecture component is excessively used when its usage is over a pre-defined threshold; and determining that the cloud architecture component is scantily used when its usage is under the pre-defined threshold.

In various example embodiments, the machine learning model can be based on a k-means algorithm. The cloud architecture component may include hardware for providing services to the component utilizer. The pattern of usage can be determined by monitoring on an hourly, daily, weekly, monthly, or yearly basis. The component utilizer can include a customer device being utilized for a business-related service. The component utilizer can include an employee device being utilized for at least one of testing, quality assurance, integration, simulations, developing, or research services.

A non-transitory computer readable medium is disclosed. The medium can include one or more sequences of instructions, which, when executed by one or more processors, may cause a computing system to perform operations comprising: monitoring utilization of a cloud architecture component that is being used by a component utilizer; determining, via a machine learning model, a pattern of usage of the cloud architecture component based on the monitoring; determining, based on the pattern of usage, a first time period when the cloud architecture component is excessively used by the component utilizer and a second time period when the cloud resource is scantily used by the component utilizer; and orchestrating, based on the first and second time periods, a scaling of the cloud architecture immediately before a subsequent iteration of the pattern of usage by the component utilizer.

A system is disclosed. The system can include a processor; and a memory having programming instructions stored thereon, which, when executed by the processor, may cause the system to perform operations, comprising: monitoring utilization of a cloud architecture component that is being used by a component utilizer; determining, via a machine learning model, a pattern of usage of the cloud architecture component based on the monitoring; determining, based on the pattern of usage, a first time period when the cloud architecture component is excessively used by the component utilizer and a second time period when the cloud resource is scantily used by the component utilizer; and orchestrating, based on the first and second time periods, a scaling of the cloud architecture immediately before a subsequent iteration of the pattern of usage by the component utilizer.

DESCRIPTION

The present disclosure describes techniques to orchestrate a scaling of cloud architecture in advance of a known change in a usage of components of the cloud architecture. In one or more embodiments described herein, the scaling of cloud architecture components can be orchestrated to enhance a usage of underutilized cloud architecture components and reduce load on overutilized cloud architecture components according to one or more utilization policies.

In several embodiments, cloud architecture may provide services and/or applications to one or more entities (e.g. a company or business). These services and/or applications may be associated with business-related functions and/or internal functions of an entity. Non-limiting examples of business-related functions can include customer devices being used for credit card transactions, transmitting messages/alerts from the cloud architecture server to customer devices, etc. Non-limiting examples of business-related functions can include employee devices being utilized for testing, quality assurance, integration, simulations, developing, or research services, etc.

In various embodiments, the services and applications may be implemented via one or more cloud architecture components. Cloud architecture components, as used herein, can include various aspects of cloud architecture. Non limiting examples can include processing power, type of processor, network traffic, server type and size, database type, database size, speed between various elements of cloud architecture, hardware that provides computational or data services utilized by the architecture.

At different times, various cloud architecture components may have excess capacity to provide support at the time of peak load and/or resource failure. For example, services and/or applications implemented by cloud architecture components may be duplicated to provide redundancy or failover. In some such examples, the components that provide the redundancy or failover may include excess resources when the redundancy or failover resources are standing by and not being used.

FIG. 1 shows a flowchart for a method 100 according to an example embodiment of the present disclosure. The method 100 can include a step 110 of monitoring utilization of a cloud architecture component that is being used by a component utilizer. In an example embodiment, a component utilizer may include, for example, customer devices (e.g. mobile phones, computers, etc.) utilizing the resources for applications and/or services provided by an entity based on cloud architecture. In another example embodiment, a component utilizer may include devices associated with employees of the company or third parties (e.g. third party vendors) that utilize the resources for one or more of testing, quality assurance, integration, simulations, developing, research, or the like. Of course, the component utilizer may also include other devices based on cloud architecture. The step 110 of monitoring can be performed by various methods known to a person of skill in the art. A component monitor as subsequently described with respect to FIG. 2 can be used to perform the step 110.

In an example embodiment, the step 110 of monitoring includes monitoring network traffic flow across various components of the cloud architecture. For example, traffic flow between various server devices or processors during a given period may be tracked. Another example can involve tracking a type (e.g. video data, audio data, textual data, etc.) of traffic flowing to and/or from various components of cloud architecture.

In an example embodiment, the capacity of various components of the cloud architecture can be monitored. For example, the utilization of processing capacity of various server devices or processors during a given period may be tracked. Similarly, the utilization of the storage capacity of various databases during a given period may be tracked.

A person of ordinary skill in the art would appreciate that other similar examples can be used for monitoring utilization of cloud architecture components. A person of ordinary skill in the art would also appreciate that any of the previously described non-limiting examples (i.e. network traffic, capacity utilization, etc.) can be used in combination for the monitoring.

The method 100 can include a step 120 of determining, via a machine learning model, a pattern of usage of the cloud architecture component by the resource utilizer based on the monitoring. The machine learning model can be trained on data that provides an indication of the utilization of various cloud architecture components. For example, the machine learning model trained on network traffic flow data may provide an indication of pending resource utilization (e.g. amount of traffic handled by various servers/databases at a given time). The machine learning model can be trained on specific traffic types (e.g. video traffic, application program interface (API) traffic, etc.) that consume different amounts of capacity of cloud architecture components (e.g. video traffic consumers more capacity than API traffic).

The machine learning model can be based on one or more supervised (e.g. neural networks) or unsupervised (e.g. clustering) machine learning algorithms. The type of algorithm used can depend on, for example, type of the training data and/or the amount of training data. For example, if the traffic flow data is labeled based on its type, then a supervised learning method can be used. For unlabeled data, an unsupervised learning method, such as a k-means algorithm can be used.

In an example embodiment, at step 120, a usage of a cloud architecture component (e.g. computing capacity for each processor and/or utilization of storage capacity of each database) can be determined for every hour of the day. This can indicate a pattern of usage of the computing capacity at various hourly time periods during the day. Similarly, at step 120, a usage a cloud architecture component can be determined for every day of the week. This can indicate a pattern of usage of the computing capacity at different days of the week. A person of ordinary skill in the art would also appreciate that similarly a pattern of usage for various other time periods (e.g. a month, year, etc.) can be determined at step 120.

The method 100 can include a step 130 of determining, based on the pattern of usage, a first time period when the cloud architecture component is excessively used by the component utilizer and a second time period when the cloud resource is scantily used by the component utilizer. For example, based on the pattern of usage determined in step 120, it may be observed that a server (server A) is operating at 40% of its capacity between 9 am and 12 pm every day and another server (server B) is at its maximum capacity between 9 am and 12 pm every day.

The time period for a pattern of usage can be based on a week, month, year, decade, or any other measure of a time. For example, every year on amazon prime day or black Friday when customers partake in shopping, a pattern of usage can be determined that indicates, for example, maximum capacity of a server of the cloud architecture associated with credit card processing by a customer device. On the other hand, a pattern of usage of a server or any other component of the cloud architecture associated with a customer device during nighttime (e.g. between 11 pm and 5 am) when customer devices are generally inactive, can be determined to indicate scant usage.

In an example embodiment, determining that the cloud architecture component is excessively used or scantily used can be based on one or more pre-defined thresholds. The pre-defined thresholds can be based on utilization policies/rules associated with any component, or operation parameters thereof, that may impact the utilization of an associated resource. The utilization policies may be based characteristics of a component utilizer. For example, the threshold for excessive usage of a cloud component for utilization by a customer device may be higher than an employee device. (e.g. the threshold can be 80% of a database's storage capacity when being utilized by customer device, the threshold can be 50% for the same database being utilized by an employee device.).

The method 100 can include a step 140 of orchestrating, based on the first and second time periods, a scaling of the cloud architecture before a subsequent iteration of the pattern of usage by the component utilizer. In example embodiments, the orchestrating can be performed by decreasing utilization of the cloud architecture component immediately before a subsequent iteration of the first time period, as defined in step 130; and/or increasing utilization of the cloud architecture component immediately before a subsequent iteration of the second time period, as defined in step 130.

In an example embodiment, the orchestrating in step 140 can be based on the type of component utilizer. This may allow that cloud architecture components allocated to component utilizers associated with the internal functions of an entity be reclaimed for utilization before component utilizers associated with the business-related functions are reclaimed. For instance, cloud architecture components may be reallocated to provide failover without interrupting services or applications provided to the customer devices. In some embodiments, the utilization policies may limit an amount of reconfiguring of the excess resources for the orchestrating in step 140. For example, a utilization policy may limit reconfiguring of a database after it reaches 80% of its storage capacity.

Figure 2:
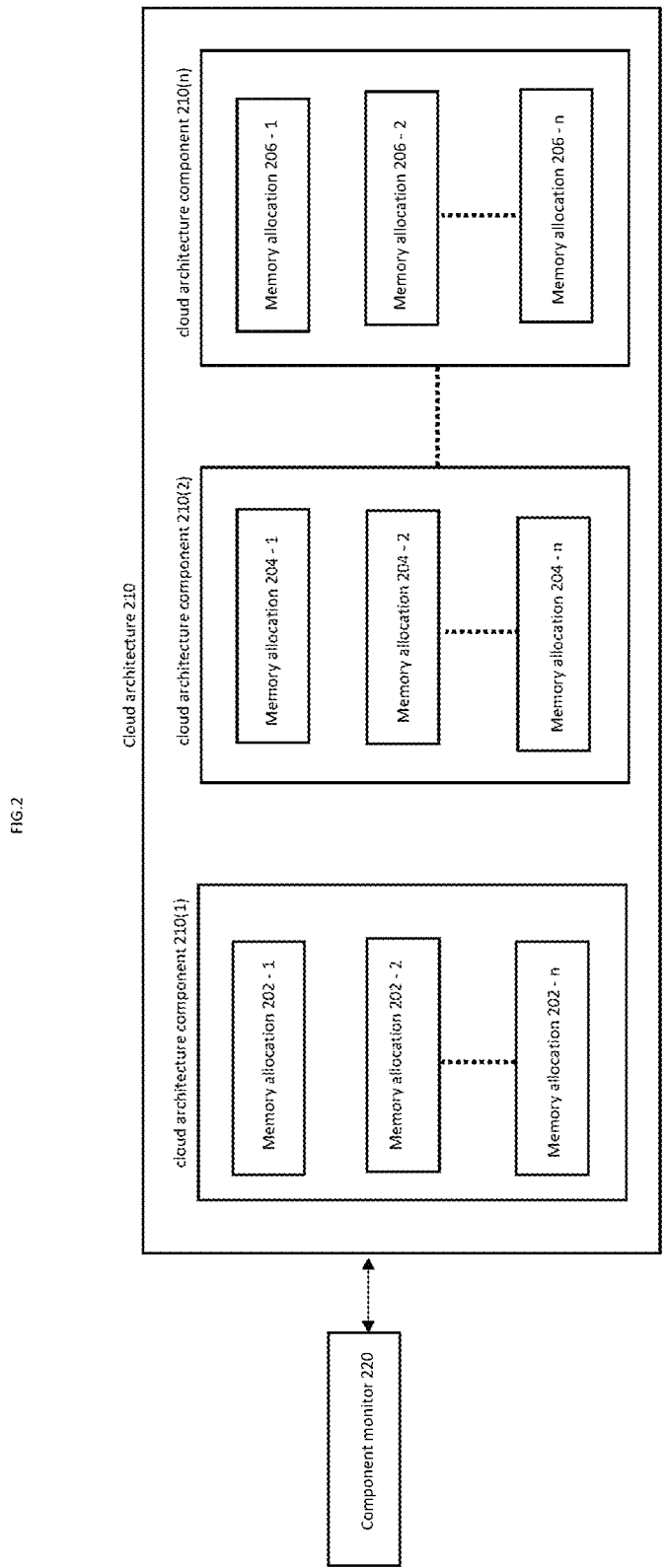
FIG. 2 illustrates a cloud architecture according to an example embodiment of the present disclosure.

FIG. 2 illustrates a cloud architecture 210 that can monitored for utilization by a component monitor 220, as previously described with respect to step 110. In example embodiments, the component monitor 220 can be a server device that is external to the cloud architecture 210 (shown) or can be based within the cloud architecture 210 (not shown).

In the illustrated embodiment, the cloud architecture component 210(1) may include one or more memory allocations 202-1, 202-2, 202-$n$, the cloud architecture component 210(2) may include one or more memory allocations 204-1, 204-2, 204-$n$, and the cloud architecture component 210($n$) may include one or more memory allocations 206-1, 206-2, 206-$n$. It will be appreciated that each of the cloud architecture components 210(1), 210(2), 210($n$) may include different or additional resources than those illustrated in FIG. 2. For example, the resources of cloud architecture may include any component utilized by a server or network infrastructure components.

In an example embodiment, the component monitor 200 can monitor traffic flow to and from each of the cloud architecture components 210(1), 210(2), 210($n$). In some examples, the component monitor 220 may monitor traffic flow to and from each memory allocation. As previously described with respect to step 110, the type of traffic flow can be monitored. In such cases, specific datatypes in the network traffic flow can be stored to certain cloud architecture components. For example, if a first memory (i.e. a cloud architecture component) is being used to store video traffic data immediately before that component would be excessively used based on its pattern of usage, then the video traffic data can be stored in a second memory, which is expected to be scantily utilized during that time period based on its pattern of usage. In this example, the pattern of usage of the first and second memory can be determined based on previously described step 120.

Figure 3:
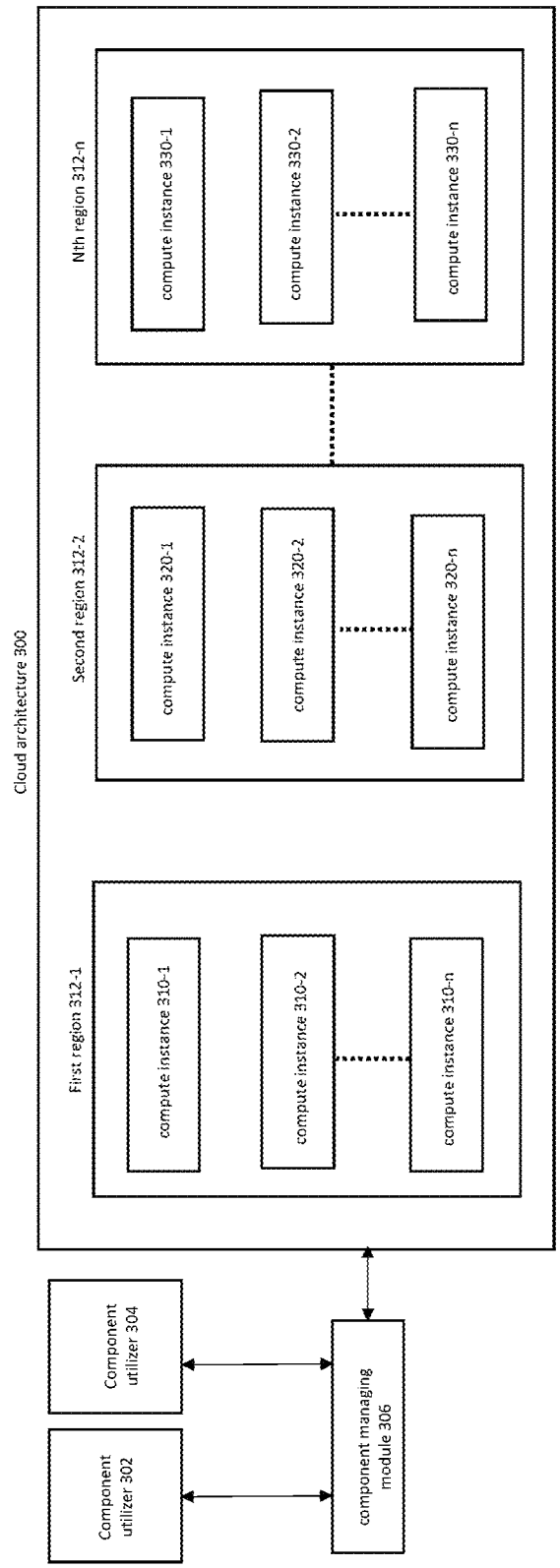
FIG. 3 illustrates a cloud architecture process flow according to an example embodiment of the present disclosure.

FIG. 3 illustrates an example processing flow of cloud architecture 300 according to one or more embodiments described herein. The cloud architecture 300 may communicate with component utilizers 302, 304 via a component managing module 306. In example embodiments, the component managing module 306 can be external (shown) or within (not shown) the cloud architecture. In example embodiments, one or more component utilizers can be used. In the illustrated embodiment, the component utilizer 302 can be, for example, a customer device being used for business related functions and the component utilizer 304 can be, for example, an employee device being used for testing etc.

In an example embodiment, the cloud architecture 300 may include a first region 312-1 with compute instances 310-1, 310-2, 310-$n$, a second region 312-2 with compute instances 320-1, 320-2, 320-$n$, a nth region 312-$n$ with compute instances 330-1, 330-2, 330-$n$. The component managing module 308 may identify one or more excess resources based on, for example, traffic flow and/or resource utilization of the compute instances in various regions (1-$n$) of the cloud architecture 300. Embodiments are not limited in this context.

In an example embodiment, in accordance with the orchestrating described in step 140, the component managing module 306 may determine traffic flow and resource utilization associated with each computer instance. In an example embodiment, 100% of the traffic from component utilizers 302, 304 (via component managing module 306) may be routed to the first region 312-1 and the traffic may be divided evenly between compute instances 310-1, 310-2, 310-3 and 314-4 (n=4) such that each compute instance in the first region 312-1 receives 25% of the traffic flow.

In various embodiments, the 25% traffic flow to each compute instance in the first region 312-1 may result in, for example, 80% resource utilization (pre-defined threshold) of the corresponding resources to process a respective traffic load. It will be appreciated that traffic loads may vary with time with higher traffic loads corresponding to higher resource utilization.

In an example embodiment, for the orchestrating described in step 140, the traffic flow may not be evenly divided between compute instances. Compute instance 310-1 may include traffic flow of 20%, compute instance 310-2 may include traffic flow of 25%, compute instance 310-3 may include traffic flow of 30%, and compute instance 310-4 may include traffic flow of 35%. Similarly, the predefined threshold for resource utilization of each of the compute instances may vary. For example, the threshold for resource utilization of compute instances 310-1 and 310-2 may be 80%, for compute instance 310-3 may be 90%, and for compute instance 310-4 may be 75%.

In an example embodiment, the second region 312-2 (n=2) may receive no traffic from component utilizers 302, 304. For example, the second region 312-2 may provide failover and/or dark instances for the first region 312-1. In many embodiments, the second region 312-2 may receive a minimal amount of traffic flow and/or resource utilization (e.g., <5%) to ensure proper operations and readiness of the resources in the region.

In many embodiments, the component managing module 306 may identify, in the first region 312-1 and/or the second region 312-2, excess resources not actively being used by component utilizers 302, 304, and allocate the excess resources based on and/or in compliance with one or more utilization policies previously described. It will be appreciated that traffic loads may vary with time with higher traffic loads corresponding to higher resource utilization.

FIG. 4 shows an example system 400 for orchestrating a scaling of cloud architecture. The device 400 may include a processor 410 and an associated memory 420. The memory 420 may have programming instructions stored thereon, which, when executed by the processor 410, causes the system 400 to perform operations. The system 400 can be connected to the cloud architecture 210 and/or 300 (shown) by a network connection (wired or wireless). The cloud architecture 300 can be connected to component utilizers 302 and/or 304 via a network connection (wired or wireless). In various example embodiments, the system 400 can be within the cloud architecture or external to the cloud architecture (as shown).

In various example embodiments, the processor 410 may be configured to perform monitoring utilization of a cloud architecture component that is being used by a component utilizer. This aspect is similar to the previously described step 110 of method 100. The processor 410 may be configured to perform determining, via a machine learning model, a pattern of usage of the cloud architecture component based on the monitoring. This aspect is similar to the previously described step 120 of method 100.

In various example embodiments, the processor 410 may be configured to perform determining, based on the pattern of usage, a first time period when the cloud architecture component is excessively used by the component utilizer and a second time period when the cloud resource is scantily used by the component utilizer. This aspect is similar to the previously described step 130 of method 100.

In various example embodiments, the processor 410 may be configured to perform orchestrating, based on the first and second time periods, a scaling of the cloud architecture immediately before a subsequent iteration of the pattern of usage by the component utilizer. This aspect is similar to the previously described step 140 of method 100.

FIG. 5 is a block diagram illustrating an example computer system 500 upon which any one or more of the methodologies (method 100 and/or system 400) may be run according to an example described herein. Computer system 500 may be embodied as a computing device, providing operations of the components featured in the various figures, including components of the system 400, method 100, or any other processing or computing platform or component described or referred to herein.

Example computer system 500 includes a processor 502 (e.g., a central processing unit (CPU), a graphics processing unit (GPU) or both), a main memory 504 and a static memory 506, which communicate with each other via an interconnect. The computer system 500 may further include a video display unit 510, an input device 512 (e.g., keyboard) and a user interface (UI) navigation device 514 (e.g., a mouse). In one embodiment, the video display unit 510, input device 512 and UI navigation device 514 are part of a touch screen display. The computer system 500 may additionally include a mass storage device 516 (e.g., a hard drive unit), a signal generation device 518 (e.g., a speaker), an output controller 532, and a network interface device 520 (which may include or operably communicate with one or more antennas 530, transceivers, or other wireless communications hardware), and one or more sensors 528.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 constituting machine-readable media.

While the machine-readable medium 522 (also known as a computer-readable medium) is illustrated in an example embodiment to be a single medium, the term "machine-readable medium" may include a single medium or multiple medium (e.g., a centralized or distributed database, and/or associated caches and servers) that store the one or more instructions 524.

The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, magnetic media or other non-transitory media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of several well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that can store, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. For example, the features in the system 500 may be client-operated software or be embodied on a server running an operating system with software running thereon. While some embodiments described herein illustrate only a single machine or device, the terms "system", "machine", or "device" shall also be taken to include any collection of machines or devices that individually or jointly execute a set (or multiple sets) of instructions to perform any one or more of the methodologies discussed herein.

Examples, as described herein, may include, or may operate on, logic or several components, modules, features, or mechanisms. Such items are tangible entities (e.g., hardware) capable of performing specified operations and may be configured or arranged in a certain manner. In an example, circuits may be arranged (e.g., internally or with respect to external entities such as other circuits) in a specified manner as a module, component, or feature. In an example, the whole or part of one or more computer systems (e.g., a standalone, client or server computer system) or one or more hardware processors may be configured by firmware or software (e.g., instructions, an application portion, or an application) as an item that operates to perform specified operations. In an example, the software may reside on a machine readable medium. In an example, the software, when executed by underlying hardware, causes the hardware to perform the specified operations.

Accordingly, such modules, components, and features are understood to encompass a tangible entity, be that an entity that is physically constructed, specifically configured (e.g., hardwired), or temporarily (e.g., transitorily) configured (e.g., programmed) to operate in a specified manner or to perform part or all operations described herein. Considering examples in which modules, components, and features are temporarily configured, each of the items need not be instantiated at any one moment in time. For example, where the modules, components, and features comprise a general-purpose hardware processor configured using software, the general-purpose hardware processor may be configured as respective different items at different times. Software may accordingly configure a hardware processor, for example, to constitute a particular item at one instance of time and to constitute a different item at a different instance of time.

In alternative embodiments, the computer system 500 can operate as a standalone device or may be connected (e.g., networked) to other machines. In a networked deployment, the computing system 500 may operate in the capacity of either a server or a client machine in server-client network environments, or it may act as a peer machine in peer-to-peer (or distributed) network environments.

Additional examples of the presently described method and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

It should be noted that the terms "including" and "comprising" should be interpreted as meaning "including, but not limited to". If not already set forth explicitly in the claims, the term "a" should be interpreted as "at least one" and "the", "said", etc. should be interpreted as "the at least one", "said at least one", etc. Furthermore, it is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for orchestrating a scaling of cloud architecture, comprising:
   monitoring an amount and type of network traffic across a cloud architecture component that is being used by a component utilizer;
   determining, via a machine learning model, a pattern of usage of the cloud architecture component based on the monitoring, wherein the machine learning model is trained on at least a type of network traffic;
   determining, based on the pattern of usage, a first time period when the cloud architecture component is excessively used by the component utilizer and a second time period when the cloud resource is scantily used by the component utilizer; and
   orchestrating, based on the first and second time periods, a scaling of the cloud architecture immediately before a subsequent iteration of the pattern of usage by the component utilizer.

2. The method of claim 1, wherein the machine learning model is based on a k-means algorithm.

3. The method of claim 1, wherein the cloud architecture component comprises hardware for providing services to the component utilizer.

4. The method of claim 1, further comprising:
   determining that the cloud architecture component is excessively used when its usage is over a pre-defined threshold; and
   determining that the cloud architecture component is scantily used when its usage is under the pre-defined threshold.

5. The method of claim 4, wherein orchestrating the scaling of the cloud architecture comprises:
   decreasing utilization of the cloud architecture component immediately before a subsequent iteration of the first time period; and
   increasing utilization of the cloud architecture component immediately before a subsequent iteration of the second time period.

6. The method of claim 1, wherein the pattern of usage is determined by monitoring on an hourly, daily, weekly, monthly, or yearly basis.

7. The method of claim 1, wherein the component utilizer comprises a customer device being utilized for a business-related service.

8. The method of claim 1, wherein the component utilizer comprises an employee device being utilized for at least one of testing, quality assurance, integration, simulations, developing, or research services.

9. A non-transitory computer readable medium comprising one or more sequences of instructions, which, when executed by one or more processors, causes a computing system to perform operations comprising:
   monitoring an amount and type of network traffic across a cloud architecture component that is being used by a component utilizer;
   determining, via a machine learning model, a pattern of usage of the cloud architecture component based on the monitoring, wherein the machine learning model is trained on at least a type of network traffic;
   determining, based on the pattern of usage, a first time period when the cloud architecture component is excessively used by the component utilizer and a second time period when the cloud resource is scantily used by the component utilizer; and
   orchestrating, based on the first and second time periods, a scaling of the cloud architecture immediately before a subsequent iteration of the pattern of usage by the component utilizer.

10. The non-transitory computer readable medium of claim 9, wherein the machine learning model is based on a k-means algorithm.

11. The non-transitory computer readable medium of claim 9, wherein the cloud architecture component comprises hardware for providing services to the component utilizer.

12. The non-transitory computer readable medium of claim 9, wherein the computing system is further configured to perform operations comprising:
   determining that the cloud architecture component is excessively used when its usage is over a pre-defined threshold; and
   determining that the cloud architecture component is scantily used when its usage is under the pre-defined threshold.

13. The non-transitory computer readable medium of claim 9, wherein the pattern of usage is determined by monitoring on an hourly, daily, weekly, monthly, or yearly basis.

14. The non-transitory computer readable medium of claim 9, wherein the resource utilizer comprises a customer device being utilized for a business-related service.

15. The non-transitory computer readable medium of claim 9, wherein the resource utilizer comprises an employee device being utilized for at least one of testing, quality assurance, integration, simulations, developing, or research services.

16. A system, comprising:
    a processor; and
    a memory having programming instructions stored thereon, which, when executed by the processor, causes the system to perform operations, comprising:
        monitoring an amount and type of network traffic across a cloud architecture component that is being used by a component utilizer;
        determining, via a machine learning model, a pattern of usage of the cloud architecture component based on the monitoring, wherein the machine learning model is trained on at least a type of network traffic;
        determining, based on the pattern of usage, a first time period when the cloud architecture component is excessively used by the component utilizer and a second time period when the cloud resource is scantily used by the component utilizer; and
        orchestrating, based on the first and second time periods, a scaling of the cloud architecture immediately before a subsequent iteration of the pattern of usage by the component utilizer.

17. The system of claim 16, wherein the machine learning model is based on a k-means algorithm.

18. The system of claim 16, wherein orchestrating the scaling of the cloud architecture comprises:
    decreasing utilization of the cloud architecture component immediately before a subsequent iteration of the first time period; and
    increasing utilization of the cloud architecture component immediately before a subsequent iteration of the second time period.

19. The system of claim 16, wherein the system is further configured to perform operations comprising:
    determining that the cloud architecture component is excessively used when its usage is over a pre-defined threshold; and
    determining that the cloud architecture component is scantily used when its usage is under the pre-defined threshold.

* * * * *